United States Patent Office 3,075,953
Patented Jan. 29, 1963

3,075,953
CATALYTIC POLYMERIZATION OF PYRROLIDONE
Norman G. Carlson, White Bear Lake, and George V. D. Tiers, St. Paul, Minn., assignors to Minnesota Mining and Manufacturing Company, St. Paul, Minn., a corporation of Delaware
No Drawing. Filed Jan. 27, 1958, Ser. No. 711,127
3 Claims. (Cl. 260—78)

This invention relates to the catalytic polymerization of pyrrolidone and to a process for the formation of an alkaline polymerization catalyst therefor.

It has been known heretofore to produce polypyrrolidone by polymerizing pyrrolidone in the presence of an alkaline polymerization catalyst, as described in U.S. Patents 2,638,463 and 2,809,958. An anhydrous nonsolvent for pyrrolidone may be used in the process, as shown in U.S. Patent 2,739,959. The alkaline polymerization catalysts stated to be useful in the above-mentioned patents consist of the alkali-metals, their amides, oxides, hydroxides and carbonates, their salts with pyrrolidone and alkali metal-alkyls and aryls, as well as the oxides of the alkaline earth metals. The most conveniently used catalysts are the alkali metal oxides, hydroxides and carbonates, which may be termed "aquagens" since all react with pyrrolidone to form the salt and liberate more or less water. The alkali metals themselves react vigorously with the formation of the corresponding salt of pyrrolidone and liberation of hydrogen. The metal amides on the other hand react to form the salts of pyrrolidone with the liberation of ammonia, which must be removed with great care and with great difficulty. Furthermore, the amides may be contaminated with azides, in which state they are therefore very dangerous to handle. Metal alkyls and aryls are, of course, very reactive and if used require anhydrous conditions and involve removal of solvents and hydrocarbons after polymerization. They are, moreover, not readily available. It is therefore evident that the practical choice of alkaline polymerization catalysts must be made from metals which are very reactive or metal oxides and other aquagens. The alkali metal salts of pyrrolidone appear to be the actual catalytic agent and may be used directly in anhydrous pure pyrrolidone, but the art seems to find the addition of the various alkaline substances named hereinabove to be the most practical procedure inasmuch as it eliminates at least one process step. However, the use of aquagens always requires that the reaction mixture be dried subsequent to the addition thereof to the pyrrolidone, for example, by distilling a portion of the pyrrolidone. When it is desired to prepare the metal salt of pyrrolidone in bulk by this process, formation of a certain amount of polymer is inevitable, hence there is no possibility of isolating the pure metal salt. Also, a large excess of pyrrolidone must be present to remove the water formed and if the distillation temperature remains high for a long time dehydration of the pyrrolidone and/or saponification of the amide may occur. Consequently, there are some serious disadvantages to the use of the aquagens.

The alkali metals, such as sodium, would seem to be highly desirable catalysts in the process for the preparation of polypyrrolidone since they do not form water in the reaction; however, they too have certain disadvantages. First, they must be free from oxides, to avoid the formation of water during the polymerization, which is not always possible for such reactive metals. Second, their rate of reaction is dependent upon their surface area which requires for ease of reaction that they be finely subdivided. This is difficult of realization because of their nature. They cannot be ground because of their malleability and if once obtained in a finely divided form such as "shot," the temperature of the reaction must be maintained below the melting point of the metal to prevent coalescence of the particles and resultant loss of reactive surface area, which, of course, becomes increasingly difficult if a very concentrated solution of metal salt of pyrrolidone is desired. The alternative is to employ an inert diluent which must be removed subsequently.

It is an object of this invention to provide an alkaline polymerization catalyst which reacts with pyrrolidone without liberating water and which can readily be prepared in finely divided form, but which is infusible at temperatures up to the boiling point of pyrrolidone. Another object of the invention is to provide a process for the polymerization of pyrrolidone using a catalyst which is non-aquagenic yet easily controlled. It is a further object of the invention to provide a process for preparing solutions of pure metal salts of pyrrolidone in anhydrous pyrrolidone solution. Other objects will become apparent hereinafter.

In accordance with the above-stated and other objects of this invention, it has been found that the hydrides of the alkali metals are useful polymerization catalysts for the production of polypyrrolidone, and can be used to produce pure metal salts of pyrrolidone in anhydrous monomer solution.

Polymerization of pyrrolidone is readily and advantageously carried out in the presence of these catalysts. Not only are the alkali metal hydrides available in finely divided form to give a fine dispersion, but they do not agglomerate during reaction even at relatively high temperatures. They therefore offer a high specific surface for reaction. Furthermore the heat of reaction is less than with the corresponding metals and hydrogen is gently evolved during reaction and tends to agitate the reaction mixture. Moreover it is found that, although substances containing active hydrogen such as ammonia, water and methanol are harmfull to polymerizations, the hydrogen liberated by the hydrides is completely innocuous and even may tend to flush out traces of impurities, while the metal hydride also seems to reduce some of the unsaturated impurities which may otherwise be somewhat deleterious without materially reducing the pyrrolidone. This is rather surprising since lithium aluminum hydride is known to be an active reducing agent for lactams and amides and a reduction would necessarily form water which as above stated would be disadvantageous. It is further unexpected since he borohydrides which fail to reduce amides are not useful as catalysts in the polymerization process. It is thus found that the metallic hydrides, while heretofore ignored by workers in the field, unexpectedly are very superior alkaline polymerization catalysts for the polymerization of anhydrous pyrrolidone.

In another aspect of the invention, the alkali metal hydrides provide a convenient method for the preparation of metallic salts of pyrrolidone as concentrated solutions in pyrrolidone. Such solutions can either be employed as catalyst solutions for the polymerization of pyrrolidone or the metal salt can be conveniently isolated and used as, for example, in the process of the above-mentioned U.S. Patent 2,638,463.

Broadly speaking, the process for polymerization according to the invention is carried out by adding to substantially anhydrous pyrrolidone from about 0.05 to 5 percent by weight of an alkali metal hydride, and effecting polymerization under substantially anhydrous conditions by the means known to the art. A preferred range is from about 0.5 to 3 percent by weight. Thus, an acyl activator, as described in U.S. Patent 2,809,958, may be added if desired, and the process can then be carried out at relatively low temperatures. Similarly, an inert solvent can be employed as a solvent to effect dispersion polymerization as set out in U.S. Patent 2,739,959. Alternatively, the mixture of monomer and alkali metal salt can be heated at a temperature up to about 80° C. over a period of time ranging from several hours to several days to bring about polymerization.

For the preparation of alkali metal salts of pyrrolidone, the alkali metal hydride is added to anhydrous pyrrolidone and the reaction between pyrrolidone and the hydride is allowed to proceed to completion without heating. The relatively mild exotherm is insufficient to bring about any polymerization. If stoichiometric amounts of pyrrolidone and hydride are used, a solid salt forms which is essentially pure but may be recrystallized, if desired. If an excess of anhydrous pyrrolidone is used, a solution of substantially pure alkali metal salt of pyrrolidone in anhydrous pyrrolidone monomer is formed. The latter is the preferred procedure, and desirably an amount of pyrrolidone is employed which will provide a final concentration of about 0.2 to 15 mole percent of alkali metal salt of pyrrolidone in the reaction mixture for use in a polymerization. A more concentrated solution from which the alkali metal salt may crystallize, may also be prepared if desired.

The alkali metal hydrides which can be used in carrying out the invention are exemplified by sodium hydride, potassium hydride, lithium hydride and the like.

In order to more fully describe this invention in particular as to the best contemplated method of operation, the following specific examples, in which parts are by weight unless otherwise specified, are appended.

Example 1

Pyrrolidone is dried by redistillation at about 40 mm. Hg pressure, rejecting a 15 percent forerun and then further distilling to produce pyrrolidone containing about 0.2 percent by weight of water, at a temperature of about 153° C. and with about 1° C. temperature range. The redistilled pyrrolidone is water white and is used directly.

In a thoroughly dry vessel is placed 0.5 part of sodium hydride. Transfers are effected under nitrogen and the flask is flushed with dry nitrogen to avoid contact with water vapor. To the vessel is then added 10 parts of the above redistilled pyrrolidone. Hydrogen is evolved rapidly and somewhat exothermically. The reaction subsides after a few minutes. The solution of sodium pyrrolidone in pyrrolidone may be preserved under anhydrous conditions at low temperatures, for example, 0° C. The solution in which polymerization is not now evident, is permitted to melt and stand under an inert atmosphere at about 25° C. for about 60 hours. At this time the reaction mixture is a firm gel. It is stirred into about 100 parts of water and washed. The insoluble polypyrrolidone is collected, rinsed with acetone to facilitate drying and dried. The white polypyrrolidone melts at about 260° C. It exhibits all the desirable characteristics of polypyrrolidone prepared by previously known methods. It is moldable between heated platens at about the melting point to form a clear flexible film.

Example 2

In a vessel fitted with mechanical agitation and flushed with an inert gas are placed 100 parts of redistilled pyrrolidone containing about 0.2 percent by weight of water. Agitation is commenced and 2 parts of sodium hydride are added. Solution is complete and evolution of hydrogen has ceased after about 15 minutes. The resultant solution is a substantially pure solution of sodium pyrrolidone in pyrrolidone. To this product 1.1 parts of acetyl chloride are added as the activator. Polymerization thereafter proceeds exothermically and is stopped about 15 minutes after the addition of acetyl chloride by pouring the thick reaction mixture with agitation into about 500 parts of water. The granular polypyrrolidone is washed and dried as in Example 1. It resembles that product in its properties and has a melting point of about 258° C. The yield is about 40 percent.

When this process is repeated using one half the specified quantities of sodium hydride and acetyl chloride, the yield of comparable product is lower.

Example 3

The procedure of Example 2 is repeated except that 1.0 part of butyrolactone is used as activator and the polymerization is terminated 60 minutes after the addition of sodium hydride. The polypyrrolidone obtained is comparable in properties to the products of the above Examples. A six to sevenfold better yield of polypyrrolidone is obtained when the procedure is repeated using 100 parts of redistilled pyrrolidone, 0.5 part of sodium hydride and 10 parts of butyrolactone, permitting the polymerization to proceed for 4 hours.

Example 4

Commercial pyrrolidone containing about 1.5 to 2.0 percent by weight of water is distilled under reduced pressure rejecting a 7 percent forerun and collecting about an 85 percent yield of redistilled material. This is further dried by passing through a column of a siliceous absorbent (available in $\frac{1}{16}''$ pellets as Molecular Sieve Type 4A from Linde Air Products Co.). In a vessel arranged as described above are placed 100 parts of this dried pyrrolidone and 1 part of sodium hydride. Solution is complete and evolution of hydrogen has ceased after 15 minutes. To the solution of sodium pyrrolidone thus prepared is added 0.025 part of anhydrous butyrolactone (dried by the same adsorption process). Polymerization commences promptly and is permitted to continue for about 65 hours. The solid mass of polymer is removed with some difficulty, broken up in water using a Waring Blendor and washed twice with water and dried. The product polypyrrolidone is a white granular material having a melting point of about 258° C. and inherent viscosity of about 1.5.

What is claimed is:

1. A process for the polymerization of 2-pyrrolidone, which comprises polymerizing the pyrrolidone under substantially anhydrous conditions in the presence of a catalytic amount of alkali metal hydride and from about 0.01 percent to 25 percent by weight, based upon the 2-pyrrolidone, of an acyl activator, each acyl radical of which is an acyl radical of a carboxylic acid.

2. The process according to claim 1, wherein the polymerization is effected by heating the polymerization mixture at a temperature up to about 80° C.

3. The process according to claim 1, wherein the alkali metal hydride is sodium hydride.

References Cited in the file of this patent

UNITED STATES PATENTS

| | | |
|---|---|---|
| 2,251,519 | Joyce | Aug. 5, 1941 |
| 2,562,797 | Koch et al. | July 31, 1951 |
| 2,638,463 | Ney et al. | May 12, 1953 |
| 2,647,105 | Mighton | July 28, 1953 |
| 2,739,959 | Ney et al. | Mar. 27, 1956 |
| 2,805,214 | Zimmerman | Sept. 3, 1957 |
| 2,809,958 | Barnes | Oct. 15, 1957 |

FOREIGN PATENTS

| | | |
|---|---|---|
| 218,129 | Australia | Jan. 16, 1958 |

OTHER REFERENCES

Hanford et al.: Jour. of Poly Science, vol. 3, Number 2 (1948), pp. 167–72.